March 16, 1926.

R. C. ROSE

CONDENSER

Filed Oct. 10, 1925

1,577,195

R. C. Rose

Inventor

By C. A. Snow & Co.

Attorneys

Patented Mar. 16, 1926.

1,577,195

UNITED STATES PATENT OFFICE.

RICHARD C. ROSE, OF OSCEOLA, ARKANSAS.

CONDENSER.

Application filed October 10, 1925. Serial No. 61,732.

*To all whom it may concern:*

Be it known that I, RICHARD C. ROSE, a citizen of the United States, residing at Osceola, in the county of Mississippi and State of Arkansas, have invented a new and useful Condenser, of which the following is a specification.

The present invention has reference to condensers used in radio hook-ups and aims to provide a glass condenser structure designed to increase the efficiency of the radio set.

An important object of the invention is to construct the body portion of the condenser in such a way that the glass condenser elements may be riveted together eliminating danger of breaking the same.

A still further object of the invention is the provision of a condenser wherein the tin foil plates are soldered to the binding posts in two places.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
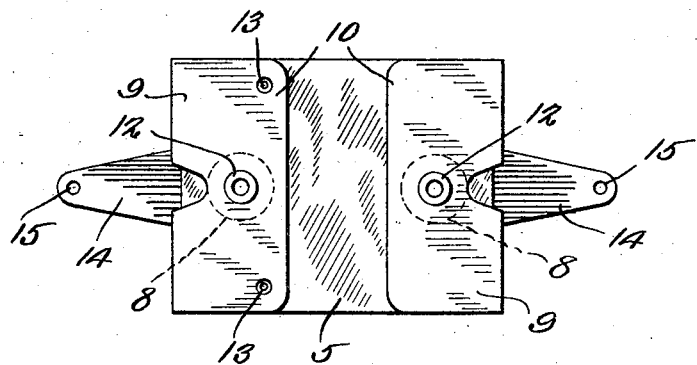
Figure 1 is a plan view of a condenser constructed in accordance with the invention.

Referring to the drawing in detail, the condenser includes a pair of glass members 5 between which the tin foil plates 6 are positioned, the tin foil plates being insulated from each other by means of the insulation 7 which is of the usual and well known construction.

These glass members 5 are formed with openings disposed intermediate the side edges thereof and arranged adjacent to the ends thereof, which openings are countersunk as at 8 for purposes to be hereinafter more fully described.

Figure 2:
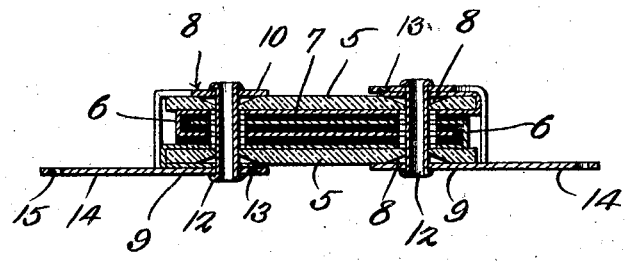
Figure 2 is a longitudinal sectional view through the condenser.
Figure 3:
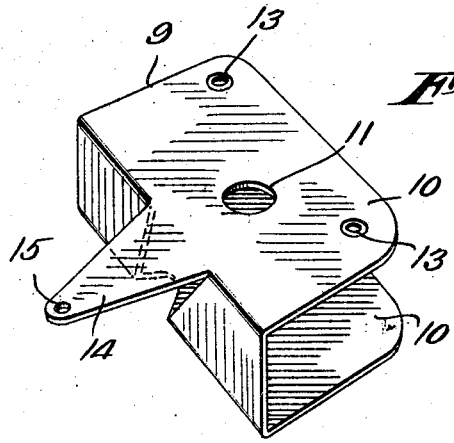
Figure 3 is a perspective view of one of the binding clips.

The clips which embrace the ends of the glass members 5, are indicated generally by the reference character 9, each clip embodying spaced flanges 10 which are provided with aligning openings 11 for the reception of the rivets 12 that are passed through openings of the glass members 5, and openings of the tin foil plates as clearly shown by Figure 2, to the end that the rivets may be set by a suitable machine without the danger of shattering the glass members 5.

As shown by Figure 2 the tin foil plates are passed around one of the ends of the respective plates where they are soldered to the clips associated therewith, as by means of solder dropped through the openings 13 of the clips.

Formed integral with each clip is a finger 14 that extends therefrom and which is provided with an opening 15 through which the usual connection to the condenser may be made.

From the foregoing it will be seen that the construction as shown and described embodies a condenser employing the glass members in place of the usual fiber insulating members commonly used in condenser construction, and which have proven a great advantage over the fiber insulation used in condensers.

I claim:

A condenser including spaced glass insulating members, said insulating members having openings disposed adjacent to the ends thereof, said openings being countersunk, tin foil plates arranged between the glass insulating members, insulating material disposed between the tin foil plates, and said clips being in circuit with the tin foil plates.

In testimony that I claim the foregoing as my own, I have hereto affixed my signature.

RICHARD C. ROSE.